3,317,381
METHOD FOR TREATING PEPTIC ULCER
Senji Umehara, Tokyo, Japan, assignor to Takeda Chemical Industries, Ltd., Osaka, Japan
No Drawing. Filed Oct. 4, 1965, Ser. No. 492,867
4 Claims. (Cl. 167—55)

The present invention is concerned with a method for treating peptic ulcer, which comprises administering coenzyme $Q_n$ of the formula:

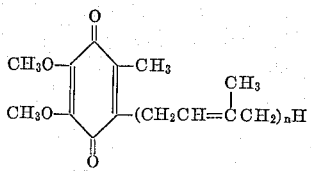

wherein $n$ is an integer of from 7 to 10 inclusive, to a patient suffering from peptic ulcer.

It is thought that peptic ulcer is chiefly caused by the action of ulcerogenic factors such as hydrochloric acid and pepsin which disturb the mucous membrane of digestive tracts, especially when the resistance of the membrane to the ulcerogenic factors is reduced. No methods having heretofore been found of reinforcing the resistance of the mucous membrane of digestive tracts, to the formation of peptic ulcers, the main object of pharmacotherapy has been limited to controlling the action of hydrochloric acid and pepsin, and in fact hitherto-known methods for treating peptic ulcer have been those by which gastrointestinal motility and secretion are inhibited, by which spasm is blocked, or hydrochloric acid in gastric juice is neutralized.

It is also said that peptic ulcer is caused by abnormal action of the central nervous system. On the basis of this theory, various sedatives or tranquilizers have also been used for treating peptic ulcer, but the therapeutic effect of the drugs is not clear.

The drugs which have heretofore been used for treating peptic ulser can be generally classified as follows:

(I) Antacid agents (neutralizing agents)—Sodium hydrogen carbonate, colloidal neutralizing agents (aluminum hydroxide, aluminum silicate), magnesium hydroxide, magnesium phosphate, calcium phosphate, calcium carbonate, anion exchange resins, amino acids, carboxymethyl cellulose.

(II) Anti-cholinergic agents—Various alkaloids such as atropin salts and belladonna.

(III) Adsorbents.

(IV) Tranquilizers.

(V) Agents for protecting the mucous membrane of the stomach and the intestines.

Antacid agents of Group I have been used over a wide range for the purpose of neutralizing or reducing acidity of gastric juice. These agents are, however, not free from such undesirable side effects as alkalosis by increasing alkalinity of the blood and stimulation of the gastric membrane, with the result of abnormally increased secretion of acid. Among the further undesirable side effects caused by these agents, there are headache, nausea, anorexia, diarrhea or constipation. As to the anion exchange resins, they have the defect of requiring the administration of rather large amounts.

On the other hand, anticholinergic agents are not free from the defects that they are liable to have undesirable side effects upon organs other than the digestive ones. Such undesirable side effects may, e.g., be dysuria, visual disturbances, constipation, thirst, dizziness, nausea and anorexia.

As to the agents of Groups III, IV and V, the therapeutic effects of these agents is minimal or indefinite.

In short, the fact is that no ideal methods for treating peptic ulcers have been provided yet. Moreover, complete treatment of peptic ulcer is very difficult because peptic ulcer tends often to recur. By the hitherto-known methods for treating peptic ulcer, only temporary symptomatic alleviation has been obtained, but the known methods are far from satisfactory from the standpoint of prevention of recurrence of peptic ulcer.

Such being the case, a drug, which can be safely applied without undesirable side effects to mammals, particularly to the human body, and also which can be administered by a simple application means, not by a troublesome means, has been a desideratum in the art.

Coenzyme $Q_n$ of the formula mentioned above is one of the coenzymes which are present naturally in animal and plant organs, and in microorganisms such as yeast, especially, in the mitochondria of the cells. Testing this coenzyme $Q_n$ on patients with peptic ulcer has uncovered the interesting new findings that the coenzyme $Q_n$ is useful in the treatment of peptic ulcers such as gastric ulcer, duodenal ulcer and gastroduodenal ulcer. The present invention is based on the said new findings by the present inventor.

The multiple homologues of coenzyme Q comprise such compounds as $Q_1$, $Q_2$, $Q_3$ ... $Q_{10}$, etc., according to the number of units in the isoprene chain; however, only coenzyme $Q_7$, coenzyme $Q_8$, coenzyme $Q_9$ and coenzyme $Q_{10}$ are used in the method of the present invention. Investigation of the activity of various homologues of coenzyme Q, using restoration of succinic acid dehydrogenase as an indicator, established that coenzymes $Q_7$, $Q_8$, $Q_9$ and $Q_{10}$ had almost the same high activity, while coenzymes $Q_1$–$Q_6$ had only low activity. Taking into consideration the facts that coenzyme $Q_{10}$ is present in the human body, and that coenzymes $Q_7$, $Q_8$, $Q_9$ and $Q_{10}$ are incorporated or collected into cells, the invention applies the coenzymes $Q_7$, $Q_8$, $Q_9$ and $Q_{10}$ for treatment of peptic ulcers such as gastric ulcer, duodenal ulcer and gastroduodenal ulcer, with the result that these compounds are very effective for such treatment.

As stated above, coenzyme Q is widely distributed in animal and plant organs, and is also found in yeast. However, the number of isoprene chains in the coenzyme Q is different depending upon the source. For example, the coenzyme Q which is present in mammals is coenzyme $Q_{10}$, i.e. the number of units in the isoprene chain is 10, while that found in micro-organisms is coenzyme $Q_6$, $Q_7$, $Q_8$, $Q_9$ or $Q_{10}$. Therefore, the coenzyme $Q_n$ of the foregoing formula can be isolated from the above-mentioned sources. The coenzyme $Q_n$ can also be prepared advantageously by utilizing the processes described in Japanese patent publications Nos. 1,877/1955 and 10,169/1957. In the present specification, coenzyme $Q_7$, $Q_8$, $Q_9$, and $Q_{10}$ are referred to as coenzyme $Q_n$, unless otherwise noted.

It is an object of the present invention to provide a method for treating peptic ulcer with coenzyme $Q_n$ of the foregoing formula.

The dosage of coenzyme $Q_n$ in the method of the present invention varies depending upon the kind or the severity of peptic ulcer or the administration methods. However, the daily dosage for an adult is generally 0.2 to 50 milligrams/kilogram, i.e., if calculated in terms of that to a patient whose body weight is 50 kilograms, is 10 to 2500 milligrams per patient per day. In case the coenzyme $Q_n$ is administered by injection, the daily adult dosage is 0.2 to 20 milligrams/kilogram. The dosage is the effective amount sufficient to attain the object of the present invention. The said dosage may be reduced when the coenzyme $Q_n$ is administered together with other drugs in the treatment of peptic ulcers.

The acute toxicity of coenzyme $Q_7$, a typical compound of the coenzyme $Q_n$, is $LD_{50}$–4000 milligrams per kilogram when administered intraperitoneally to mice. Toxic manifestations were not observed with daily intraperitoneal injection of 10, 20 and 50 milligrams per kilogram, respectively, in rats for 30 days and no changes were observed histologically in the pituitary, thyroid, thymus, heart, lung, liver, adrenals, spleen, kidney or testes.

According to the present invention, the active ingredient of the coenzyme $Q_n$ of the foregoing formula may be admixed with a carrier which may be either a sterile parenteral liquid or a solid material. The compositions may take the form of tablets, powders, capsules or other dosage forms which are particularly useful for administration through the digestive tract. Liquid diluents are employed in sterile condition for parenteral use, that is, by injection. Such a medium may be a sterile solvent such as water or vegetable oils. The compositions may take the form of active material, namely, active ingredient thereof, admixed with solid diluents and/or tableting adjuvants such as cornstarch, lactose, talc, stearic acid, magnesium stearate, gums, or the like.

Any of the tableting materials used in pharmaceutical practice may be employed where there is no incompatibility with the said active ingredient. Alternatively, the active ingredient with its adjuvant material may be placed in the usual capsules or resorbable material, such as the usual gelatin capsule and administered in that form. In yet another embodiment, the composition may be put up into powder packets.

Or the active ingredient may be prepared in the form of suspension or emulsion in a material in which the active ingredient is not soluble.

The principal merits of the method of the present invention are the following:

(1) A non-toxic and physiological substance native to living organisms is employed.

(2) Resistance of the membrane of the digestive tract to such attacking factors as acid or pepsin can be increased and also regeneration of the membrane can be promoted.

(3) The method is effective not only for peptic ulcers in the initial stage but also for those in the late stage.

(4) Synergistic effect can be expected by combination with anabolic steroids.

(5) Recurrence can be prevented.

(6) There are no undesirable side effects.

(7) Influence on acidity of the gastric juice is not observed.

No method possessing all these merits together can be found among hitherto-known methods for treating peptic ulcer.

For the purpose of giving those skilled in the art a better understanding of the invention, the following illustrative examples of preparations are given:

(1) A capsule containing 5.0 milligrams of coenzyme $Q_7$ and 77.0 milligrams of granular lactose.

(2) A capsule containing 20.0 milligrams of coenzyme $Q_7$ and 230.0 milligrams of granular lactose.

(3) A capsule containing 10.0 milligrams of coenzyme $Q_9$ and 140.0 milligrams of granular lactose.

(4) A capsule containing 20.0 milligrams of coenzyme $Q_7$ and 230.0 milligrams of granular lactose.

(5) An injection composition containing 10 milligrams of coenzyme $Q_7$, 100 milligrams of surface active agent (a mixture of hydrogenated castor oil and ethylene oxide), 10 milligrams of benzyl alcohol, 9 milligrams of sodium chloride, and distilled water (to make the whole amount 1 milliliter).

(6) An injection composition containing 10 milligrams of coenzyme $Q_9$, 100 milligrams of surface active agent (a mixture of hydrogenated castor oil and ethylene oxide), 10 milligrams of benzyl alcohol, 9 milligrams of sodium chloride, and distilled water (to make the whole amount 1 milliliter).

(7) Vial injection composition containing 50 milligrams of coenzyme $Q_{10}$, 500 milligrams of polyethylene oxide sorbitan mono-oleate, 50 milligrams of benzyl alcohol, 45 milligrams of sodium chloride and distilled water (to make the whole amount 5 milliliters).

(8) Vial injection composition containing 100 milligrams of coenzyme $Q_7$, 1000 milligrams of surface active agent (a mixture of hydrogenated castor oil and ethylene oxide), 100 milligrams of benzyl alcohol, 90 milligrams of sodium chloride, and distilled water (to make the whole amount 10 milliliters).

(9) A capsule containing 100 milligrams of coenzyme $Q_9$ and vegetable oil.

(10) A capsule containing 100 milligrams of coenzyme $Q_8$ and 250 milligrams of granular lactose.

Following are clinically illustrated examples of presently preferred embodiments of the present invention. From these, it will become clear that the coenzyme $Q_n$ of the foregoing formula possesses all the above-mentioned merits.

In the following description, "mg.", "kg." and "mm." mean milligram(s), kilogram(s) and millimeter(s), respectively.

*Examples*

(I) *Materials.*—Only cases, in which definite findings of ulcer on examination with X-ray or gastrocamera were observed, were used in these examples. As shown in Table 1, there were 27 cases consisting of 22 with gastric ulcer, 4 with duodenal ulcer and one with gastroduodenal ulcer. Of the 27 cases, 23 were males and 4 were females. The ages of these cases ranged from 23 to 71 years.

(II) *Methods.*—Of the Coenzyme $Q_n$ of the foregoing formula, Coenzyme $Q_7$ was selected in these examples as therapeutic agent. Two kinds of capsules of this drug were prepared. One contained 20.0 mg. of Coenzyme $Q_7$ and 230.0 mg. of granular lactose and the other contained 5 mg. of Coenzyme $Q_7$ and 77.0 mg. of granular lactose. These were given orally 30 minutes after each of 3 meals. To one patient only, the drug containing 10 mg. of Coenzyme $Q_7$, 100 mg. of surface active agent (a mixture of hydrogenated castor oil and ethylene dioxide), 10 mg. of benzyl alcohol and 9 mg. of sodium chloride, was given intramuscularly once a day.

(III) *Doses.*—60 mg. of Coenzyme $Q_7$ were given daily in almost all cases, but in some cases 30 or 40 mg. of this drug were given in the early period of the treatment and then the doses were gradually reduced to 15 mg. per day. The daily average doses of all cases was 58.0 mg. The duration of the treatments was from 14 to 144 days, or 71.8 days on average. The daily average dose and the duration of administration in each group are shown in Table 1. There were 56.8 mg. and 62.3 days in the gastric ulcer group, 57.4 mg. and 68.2 days in the duodenal ulcer group and 60 mg. and 85 days in one case with gastro-duodenal ulcer, respectively.

(IV) *Results of the treatment and findings.*—As shown in Table 1, the results of the treatment are as follows: Complete disappearance of niche was observed in 16 of 22 cases with gastric ulcer and in all 5 cases with duodenal and gastro-duodenal ulcer. A total 21 of 27 patients were cured completely and the disappearance percentage of niche by this treatment was 77.8. In the remaining 5 cases with gastric ulcer, decrease in size of the ulcer was seen. Including these ameliorated cases, the rate of therapeutic effectiveness of the drug to the ulcers was as high as 96.3%, while only one case (3.7%) did not show any response to this therapeutic procedure. No exacerbation was observed in these cases. The results in each group are summarized as follows:

(1) *Gastric ulcer.*—Of 22 cases with gastric ulcer, 18 were males and 4 were females, ranging in age from 25 to 71 years (41 years old on average). The duration after onset of manifestations of gastric ulcer was as follows:

|  | Percent |
|---|---|
| Less than 1 year, 8 cases | 36.4 |
| Over 1 year, 14 cases | 63.6 |

Of these, three cases were of over 10 years.

In 4 cases (18.2%), Coenzyme $Q_7$ only was given and in 2 cases (9.1%), the drug was given in combination with a simple antacid, which consisted mainly of sodium bicarbonate. Of the other 16 cases (62.7%), 12 were given it with an usual antacid preparation or anticholinergic agent and 4 cases with an anabolic steroid alone or a combination of an anabolic steroid and antichloinergic agent or an usual antacid preparation. 10 of these cases, which had suffered from ulcers for more than one year, did not reveal any favorable response by administration of such usual drugs. These drugs, therefore, were used only for ameliorating subjective symptoms of the stomach with Coenzyme $Q_7$. Of 22 cases, 5 patients had complications such as hyperthyroidism, hepatitis or heart disease.

(a) *X-ray findings.*—Niche was observed in all 22 cases as mentioned earlier. The position and size of the niches are shown in Table 2. Niches disappeared in 16 of 22 cases (72.7%), decreased in 5 cases (22.8%) and did not change in one case. The period required for disappearance of ulcer is shown in Table 2. The craters disappeared within 4 weeks in 2 of 16 cases (or 12.5%); within 6 weeks in 8 cases (50%); within 8 weeks in 11 cases (68.7%); within 10 weeks in 13 cases (81.3%); and over 10 weeks in 3 cases (18.7%), respectively. The longest term of treatment required for complete disappearance of niches was 136 days. And the average period was 53.2 days. Of 5 cases, which showed only a reduction in size of the crater, one was discharged from hospital only 2 weeks after the treatment because of unavoidable circumstances. In another case, the treatment was stopped due to local pain and edema caused by injections. The third case is still under observation. The other two of these 5 patients did not show complete disappearance of the crater even after long term treatment, but only a decrease of it. These two patients, however, had complications, such as bundle branch block and liver diseases (multiple cystoma and chronic hepatitis). One of them showed a marked reduction in size of ulcer following improvement of the complications after 14 weeks of treatment. In another case, the treatment was stopped at the 144th day, because reduction in size of ulcer was observed 3 weeks after treatment, but thereafter not observed.

Complete cure of niche was observed in 6 (75%) of 8 cases with fresh gastric ulcer, which had developed within the past one year. On the other hand, in 10 (71.4%) of 14 cases with ulcer, which had continued for more than 1 year, complete disappearance was seen between the results of these two groups. In all 6 cases, 4 treated with Coenzyme $Q_7$ alone and 2 treated with a combination of Coenzyme $Q_7$ alone and 2 treated with a combination of Coenzyme $Q_7$ and a simple antacid powder (no other active anti-ulcer agents were used), niche disappeared completely.

(b) *Occult blood in the feces.*—Occult blood in the stool was found in 14 of 22 cases before the treatment and disappeared in all cases after the treatment. The period required for these disappearances ranged from 5 to 95 days, or 21.5 days on the average. As shown in Table 3, occult blood disappeared rapidly till 3 weeks after the beginning of the treatment, the rate of disappearance being 71.5%.

(c) *Body weight.*—Body weight was measured in 19 cases during the treatment. As shown in Table 4, of 13 cases, which were cured completely, 10 cases showed an increase of body weight, and the other 3 cases showed no change, and no decrease was observed. Of 6 cases in which reduction in size of ulcer was observed, 3 cases showed an increase of body weight, 1 case no change and 2 a reduction of body weight. The most remarkable increase of body weight in these cases was 6 kilograms. 42.1% of these patients showed an increase of over 2 kilograms, and the average increase in body weight was 1.5 kilograms.

(d) *Acidity of the gastric juice.*—Of 8 cases in which gastric juice acidity was measured prior to the treatment, 4 showed hyperacidity and the other half hypoacidity. In the 4 former cases, a tendency toward a decrease in acidity was observed during the treatment with Coenzyme $Q_7$. Two of them recovered to normal acidity. In the 4 latter cases, no change was seen in acidity. Of these cases, acidity of gastric juice in 2 cases treated with Coenzyme $Q_7$ alone is shown in Table 5.

(2) *Duodenal ulcer and gastro-duodenal ulcer.*—Four cases with duodenal ulcer and one case with gastroduodenal ulcer were treated with Coenzyme $Q_7$, as summarized in Table 6. All the patients were males and ranged in age from 23 to 61 years, the average being 40.4 years. In all these cases, the symptoms of ulcer had continued for more than 1 year. The dose of Coenzyme $Q_7$ and the term of treatment have been mentioned already. Of these cases, 1 was treated with Coenzyme $Q_7$ alone and the others were treated with Coenzyme $Q_7$ and a combination of usual antacid preparations. One complication, already cured pulmonary tuberculosis, was found in 1 case.

(a) *X-ray findings.*—In 2 cases, niches in the duodenal bulbus were proved, and in 3 other cases residual shadows (flech) were observed roentgenologically. After the treatment with Coenzyme $Q_7$, niches and flechs disappeared and clinical improvement was obtained in all 5 cases. The days required for the disappearance of roentgenological findings ranged from 40 to 75 days, making an average 55.8 days. There was no significant difference between the disappearance rate of the roentgenological findings in the duodenal ulcer and that obtained in gastric ulcer. The most rapid disappearance time of the ulcer was 40 days, which was seen in the case treated with Coenzyme $Q_7$ alone.

(b) *Occult blood in the feces.*—Occult blood in the feces was found in 4 cases and disappeared in 5 to 47 days following treatment in all cases, making the average 44.0 days.

(c) *Body weight.*—No improvements in body weight were found in two cases. In the other three cases, an increase in body weight was observed that is, 3.0 kilograms in 2 cases and 2.0 kilograms in 1 case. No decrease in body weight was seen in any of these cases.

(d) *Acidity of the gastric juice.*—Acidity of the gastric juice was examined in 3 cases. Of these, two had hyperacidity and one showed normal acidity. In one case of the patients with hyperacidity, acidity returned to normal level during the treatment and in the other one case, it also lowered, but not to normal range. In the one case with normal acidity, acidity did not change during the treatment. However, it should not be considered that these changes in acidity are only caused by administration of Coenzyme $Q_7$, because these patients were given Coenzyme $Q_7$ and other antacid drugs simultaneously.

(3) *Side effects.*—No undesirable side effects were seen in the patients treated by oral administration of Coenzyme $Q_7$. No abnormal changes in the blood picture, serum constituents and liver function or urine findings were observed either during the treatment.

(V) *Comments and conclusion.*—The data mentioned above are the summarized results of the therapy of gastric and duodenal ulcer with Coenzyme $Q_7$, which was selected as a typical agent from Coenzyme $Q_n$ derivatives. The disappearance rate of roentgenological findings was 72.8% in the gastric ulcer, 100% in the duodenal and gastroduodenal ulcer. The disappearance rate in a total of 27 cases was 77.8%. This is far higher than that obtained from ordinary treatment with usual antiulcer drugs (46.0%) and that of the treatment using anticholinergic agents (60), which was studied by the inventor. It is also noteworthy that 4 cases with gastric ulcer and 1 with duodenal ulcer were cured completely, at a comparatively earlier stage of treatment, by the administration of Coenzyme $Q_7$ alone and two cases with gastric ulcer were also healed with a combination of Coenzyme $Q_7$ and simple antacid powder.

The average time required for disappearance of occult blood in feces was 21.5 days in the patients with gastric ulcer and was 44.0 days in those with duodenal ulcer. The influence of Coenzyme $Q_7$ on the acidity of gastric juices seems to be negligible. Body weights in patients, in which the ulcers cured completely, appeared to show a tendency toward increase by this therapy. No side effects were found during the treatment by oral administration of Coenzyme $Q_7$.

TABLE 1.—SUMMARY OF CASES OF COENZYME $Q_7$

| Disease | Number of Cases | Coenzyme $Q_7$ | | Effect | | | |
|---|---|---|---|---|---|---|---|
| | | Daily Dose (mg.) | Duration of use (day) | Cure (disappearance) of niche | Improved (reduction) | No-change | Exacerbated (increase) |
| Gastric Ulcer | 22 | 15~60 (56.6) | 14~136 (62.3) | 16 | 5 | 1 | 0 |
| Duodenal Ulcer | 4 | 45~60 (57.4) | 57~98 (68.2) | 4 | 0 | 0 | 0 |
| Gastro Duodenal Ulcer | 1 | 60 | 85 | 1 | 0 | 0 | 0 |
| Total | 27 | ¹ (58.0) | ¹ (71.8) | 21 | 5 | 1 | 0 |
| Percent | | | | 77.8 | 18 5 | 3.7 | |

¹ Average.

TABLE 2.—SUMMARY OF CASES OF GASTRIC ULCER

| Case No. | Name | Age | Sex | Duration after onset | Findings by X-ray | | Complication |
|---|---|---|---|---|---|---|---|
| | | | | | Site | Size (mm.) | |
| 1 | M.M. | 48 | M | 4 years | Corpus | 10 x 20 | |
| 2 | Z.T. | 71 | M | 10 years | do | 5 x 5 | Duodenal diverticulum. |
| 3 | K.S. | 47 | M | 8 years | do | 5 x 7, 3 x 5 | |
| 4 | T.A. | 49 | M | 2 months | Angulus | 12 x 15 | |
| 5 | H.O. | 28 | F | 2 years | Corpus | 2 x 12 | Toxic goiter. |
| 6 | N.O. | 40 | M | Over 1 year | do | 15 (line) | |
| 7 | U.K. | 29 | M | 6 months | Angulus | 7 x 7 | |
| 8 | S.A. | 32 | M | | do | 5 x 15 | |
| 9 | S.M. | 35 | M | 10 years | Antrum | 8 x 8 | |
| 10 | S.T. | 33 | M | 1 month | Angulus | 4 x 10 | |
| 11 | T.S. | 23 | M | 2 months | Angulus | 8 x 15 | |
| 12 | T.K. | 26 | M | 10 years | Corpus Angulus | 6 x 8, 6 x 7 | |
| 13 | K.K. | 48 | F | 3 years | Angulus | 12 x 28 | |
| 14 | K.K. | 37 | M | 4 years | do | 3 x 13 | Chronic myelocytic leukemia. |
| 15 | A.K. | 36 | M | 2 years | Part of anastomosis | 4 x 4 | |
| 16 | Y.M. | 59 | M | | Angulus | 6 x 12 | |
| 17 | U.K. | 40 | F | 3 years | do | 12 x 20 | |
| 18 | M.M. | 34 | M | | do | 12 x 30 | |
| 19 | K.H. | 63 | M | 2 years | Corpus | 12 x 4 | Chronic hepatitis in right bundle branch block. |
| 20 | M.K. | 50 | F | 4 years | do | 9 x 7 | Multiple cystoma. |
| 21 | T.T. | 31 | M | 6 months | Angulus | 5 x 5 | |
| 22 | K.E. | 45 | M | 10 years | Corpus | 8 x 10 | |

| Case No. | Name | Age | Sex | Coenzyme $Q_7$ | | | Other Treatment |
|---|---|---|---|---|---|---|---|
| | | | | Daily dose (mg.) | Duration (days) | Total (mg.) | |
| 1 | M.M. | 48 | M | 60 | 26 | 1,560 | Stomach powder. |
| 2 | Z.T. | 71 | M | 60 | 41 | 2,460 | Do. |
| 3 | K.S. | 47 | M | 60 | 40 | 2,400 | Anti-cholinergics blood transfusion. |
| 4 | T.A. | 49 | M | 60 | 35 | 2,150 | Blocking drugs against the nerve, anti-cholinergics. |
| 5 | H.O. | 28 | F | 60 | 45 | 2,700 | |
| 6 | N.O. | 40 | M | 15~30 | 41 | 1,065 | |
| 7 | U.K. | 29 | M | 45~60 | 54 | 2,435 | |
| 8 | S.A. | 32 | M | 60 | 100 | 6,000 | |
| 9 | S.M. | 35 | M | 60 | 72 | 4,200 | Anti-cholinergics. |
| 10 | S.T. | 33 | M | 60 | 58 | 2,480 | (*). |
| 11 | T.S. | 23 | M | 60 | 95 | 5,700 | Anti-cholinergics. |
| 12 | T.K. | 26 | M | 60 | 72 | 4,320 | (*). |
| 13 | K.K. | 48 | F | 60 | 109 | 6,540 | Anti-cholinergics. |
| 14 | K.K. | 37 | M | 60 | 136 | 6,720 | Do. |
| 15 | A.K. | 36 | M | 60 | 14 | 840 | Anti-ulcer drugs. |
| 16 | Y.M. | 59 | M | 60 | 14 | 840 | Do.* |
| 17 | U.K. | 40 | F | 60 | 63 | 3,980 | Anti-cholinergics. |
| 18 | M.M. | 34 | M | 60 | 63 | 3,980 | Do. |
| 19 | K.H. | 63 | M | 60 | 112 | 6,720 | Do.* |
| 20 | M.K. | 50 | F | 60 | 144 | 8,640 | Do.* |
| 21 | T.T. | 31 | M | 60 | 30 | 1,800 | Do. |
| 22 | K.E. | 45 | M | 15~40 | 23 | 785 | Anti-ulcer drugs. |

| Case No. | Name | Age | Sex | Effect Ulcer Improvement | Effect Required Duration (days) | Side Effects | Remarks |
|---|---|---|---|---|---|---|---|
| 1 | M.M. | 48 | M | Disappeared | 16 | | |
| 2 | Z.T. | 71 | M | do | 27 | | |
| 3 | K.S. | 47 | M | do | 31 | | |
| 4 | T.A. | 49 | M | do | 35 | | |
| 5 | H.O. | 28 | F | do | 37 | | |
| 6 | N.O. | 40 | M | do | 36 | | |
| 7 | U.K. | 29 | M | do | 39 | | Trace cured. |
| 8 | S.A. | 32 | M | do | 42 | | |
| 9 | S.M. | 35 | M | do | 55 | | |
| 10 | S.T. | 33 | M | do | 56 | | |
| 11 | T.S. | 23 | M | do | 61 | | |
| 12 | T.K. | 26 | M | do | 72 | | |
| 13 | K.K. | 48 | F | do | 97 | | |
| 14 | K.K. | 37 | M | do | 136 | | |
| 15 | A.K. | 36 | M | Reduced | 14 | | Continuous administration. Resection of the stomach 3 years ago. |
| 16 | Y.M. | 59 | M | Reduced (⅓) | 14 | | Suspended. Left a hospital by unavoidable reason. |
| 17 | U.K. | 40 | F | Disappeared | 63 | | Continuous administration. |
| 18 | M.M. | 34 | M | do | 48 | | Do. |
| 19 | K.H. | 63 | M | Reduced (½) | 112 | | Do. |
| 20 | M.K. | 50 | F | do | 144 | | Suspended. |
| 21 | T.T. | 31 | M | No change | | | Do. |
| 22 | K.E. | 45 | M | Reduced (¼) | 23 | + | Do. |

*Anabolic steroid.

NOTE.—M signifies male; F signifies female.

TABLE 3.—DISAPPEARING PACE OF OCCULT BLOOD OF FECES (GASTRIC ULCER)

| | Pretreatment | Weeks | | | | | |
|---|---|---|---|---|---|---|---|
| | | 1 | 2 | 3 | 4 | 6 | Over 10 |
| Percent | 0 | 21.0 | 64.2 | 71.5 | 78.5 | 93.8 | 100.0 |

TABLE 4.—EFFECT ON BODY WEIGHT (GASTRIC ULCER)

| | Number of cases | −2.0 (kg.) | −1.0 (kg.) | 0.~0.9 (kg.) | 1.0~1.9 (kg.) | 2.0~2.9 (kg.) | 3.0~3.9 (kg.) | 4.0~4.9 (kg.) | 5.0~5.9 (kg.) | 6.0~6.9 (kg.) |
|---|---|---|---|---|---|---|---|---|---|---|
| Disappearance | 13 | 0 | 0 | 3 | 3 | 3 | 1 | 1 | 1 | 1 |
| Reduction | 6 | 1 | 1 | 1 | 2 | 0 | 1 | 0 | 0 | 0 |
| Total | 19 | 1 | 1 | 4 | 5 | 3 | 2 | 1 | 1 | 1 |

← 10.4% → ← 42.1% →
← 68.6% →

Average increase 1.52 kg.

TABLE 5.—VARIATION OF ACIDITY OF GASTRIC JUICE (IN THE SINGLE ADMINISTRATION OF COENZYME $Q_7$ IN GASTRIC ULCER)

| | | Free Acidity | | | | | | | Total Acidity | | | | | | |
|---|---|---|---|---|---|---|---|---|---|---|---|---|---|---|---|
| | | Before | 15′ after | 30′ | 45′ | 60′ | 75′ | 90′ | Before | 15′ after | 30′ | 45′ | 60′ | 75′ | 90′ |
| Z.T.* | Before treatment | 0 | 5 | 7 | 8 | 1 | −2 | −8 | 30 | 12 | 16 | 19 | 15 | 12 | 5 |
| | After treatment | −25 | −10 | 5 | −8 | | | 6 | 10 | 6 | 20 | 0 | | | 35 |
| S.A.* | Before treatment | −10 | 0 | 10 | 10 | −5 | 5 | | 15 | 5 | 20 | 25 | 20 | 25 | |
| | After treatment | −15 | −15 | −5 | 0 | 10 | 5 | | 10 | 5 | 15 | 25 | 20 | 30 | |

*Initials of Patient's Name.

NOTE.—The symbol (′) signifies minutes.

TABLE 6.—SUMMARY OF CASES OF DUODENAL ULCER AND GASTRIC AND DUODENAL ULCER

| Case No. | Name | Age | Sex | Disease | Periods after onset (year) | Findings by X-ray examination | Complication |
|---|---|---|---|---|---|---|---|
| 1 | T.U. | 51 | M | Duodenal ulcer | 2 | Residual shadow in bulbus | |
| 2 | M.K. | 61 | M | do | 1 | Residual shadow in bulbus (transformation of bulbus+). | |
| 3 | M.N. | 37 | M | do | 2 | Bulbus Niche (transformation+) | Tuberculosis. |
| 4 | Z.K. | 23 | M | do | 1 | Residual shadow in bulbus | |
| 5 | A.S. | 30 | M | Gastro duodenal | 6 | Residual shadow in gastric corpus, Bulbus Niche. | |

| Case No. | Name | Age | Sex | Coenzyme Q7 | | | Other Treatment | Effects | | Side Effects | Remarks |
|---|---|---|---|---|---|---|---|---|---|---|---|
| | | | | Daily dose (mg.) | Duration (days) | Total dosis (mg.) | | X-ray | Required days | | |
| 1 | T.U | 51 | M | 45-60 | 61 | 3,030 | | Disappeared | 40 | | |
| 2 | M.K | 61 | M | 60 | 57 | 3,420 | Anticholinergics | do | 45 | | |
| 3 | M.N | 37 | M | 60 | 57 | 3,420 | do | do | 57 | | |
| 4 | Z.K | 23 | M | 60 | 98 | 5,580 | do | do | 62 | | |
| 5 | A.S | 30 | M | 60 | 85 | 5,100 | do | do | 75 | | |

NOTE.—The symbol + stands for "is present."

Having thus disclosed the invention, what is claimed is:

1. A method of treating peptic ulcer, which comprises administering an effective amount of coenzyme $Q_n$ of the formula

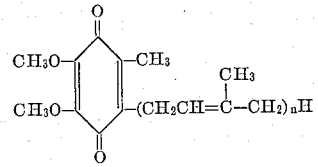

wherein $n$ is an integer from 7 to 10 inclusive, to a patient with the disease.

2. A method of treating peptic ulcer, which comprises administering 10 to 2500 milligrams of coenzyme $Q_n$ of the formula

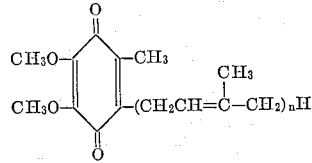

wherein $n$ is an integer from 7 to 10 inclusive, per day orally to a patient with the disease.

3. A method of treating peptic ulcer, which comprises administering 10 to 1000 milligrams of coenzyme $Q_n$ of the formula

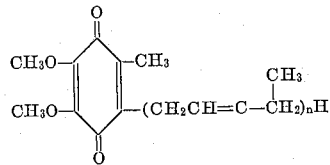

wherein $n$ is an integer from 7 to 10 inclusive, per day by injection to a patient with the disease.

4. A method of treating peptic ulcer, which comprises administering an effective amount of coenzyme $Q_7$ to a patient with the disease.

No references cited.

ALBERT T. MEYERS, *Primary Examiner.*

S. J. SINGER, *Assistant Examiner.*